United States Patent [19]
Harrison

[11] Patent Number: 5,751,989
[45] Date of Patent: May 12, 1998

[54] SYSTEM FOR DECENTRALIZING BACKING STORE CONTROL OF VIRTUAL MEMORY IN A COMPUTER

[75] Inventor: David F. Harrison, Los Gatos, Calif.

[73] Assignee: Apple Computer, Inc., Cupertino, Calif.

[21] Appl. No.: 743,344

[22] Filed: Nov. 4, 1996

Related U.S. Application Data

[63] Continuation of Ser. No. 128,706, Sep. 30, 1993, abandoned.

[51] Int. Cl.$^6$ ........................................ G06F 12/08
[52] U.S. Cl. ........................ 395/413; 395/406; 395/489; 395/440; 395/730
[58] Field of Search ........................ 395/406, 402, 395/403, 435, 441, 489, 835, 730, 440, 619, 620, 621, 413

[56] References Cited

U.S. PATENT DOCUMENTS

| | | | |
|---|---|---|---|
| 4,489,378 | 12/1984 | Dixon et al. | 395/853 |
| 4,490,782 | 12/1984 | Dixon et al. | 395/485 |
| 4,533,995 | 8/1985 | Christian et al. | 395/440 |
| 4,621,320 | 11/1986 | Holste et al. | 395/421.07 |
| 4,868,738 | 9/1989 | Kish et al. | 395/846 |
| 4,888,691 | 12/1989 | George et al. | 395/182.13 |
| 5,101,485 | 3/1992 | Perazzoli, Jr. | 395/416 |
| 5,193,170 | 3/1993 | Lam | 395/473 |
| 5,291,598 | 3/1994 | Grundy | 395/650 |
| 5,361,340 | 11/1994 | Kelly et al. | 395/403 |
| 5,396,614 | 3/1995 | Khalidi et al. | 395/445 |
| 5,511,177 | 4/1996 | Kagimasa et al. | 395/441 |
| 5,522,054 | 5/1996 | Gunlock et al. | 395/439 |

OTHER PUBLICATIONS

Rashid, et al, "Machine–Independent Virtual Memory Management for Paged Uniprocessor and Multiprocessor Architectures", Proceedings Second International Conference on Architectural Support for Programming Languages and Operating Systems (ASPLOS), Oct. 5, 1987, pp. 31–39.

*Association for Computing Machinery*, "Application–Controlled Physical Memory using External Page–Cache Management", Kieran Harty et al, 1992, pp. 187–197.

Primary Examiner—Jack B. Harvey
Assistant Examiner—Ario Etienne
Attorney, Agent, or Firm—Burns, Doane, Swecker & Mathis, LLP

[57] ABSTRACT

A virtual memory system for a computer employs decentralized management of secondary storage media. The caching of data obtained from secondary storage is controlled by software management entities that lie outside of the operating system. These entities communicate with the operating system through a message-based interface relationship. With the decentralized approach, the operating system can remain relatively simple, while specific backing store management entity modules can be tailored to accommodate new types of hardware and data organization.

21 Claims, 7 Drawing Sheets

SYSTEM FOR DECENTRALIZING BACKING STORE CONTROL OF VIRTUAL MEMORY IN A COMPUTER

This application is a continuation of application Ser. No. 08/128,706, filed Sep. 30, 1993 now abandoned.

FIELD OF THE INVENTION

The present invention directed to the management of memory in a computer system, and more particularly to the management of backing store data in a virtual memory system for a computer.

BACKGROUND OF THE INVENTION

Virtual memory technology is a memory management technique that enables an application program to effectively utilize a greater amount of memory than is available in the physical memory, e.g. RAM, of a computer. More particularly, many currently available computers are capable of running several applications programs at one time. When multiple programs are running at once, the total amount of memory that they require may be greater than the physical memory of the computer. If the memory is not sufficiently large to store all of the programs and data files that may be needed, only portions of one or more of the files can reside in the memory at any given time. The remaining portions of the files are retained on a secondary storage medium, such as a magnetic disk. During the operation of a program, if a call is made to a portion of a file which is not present in the physical memory, it is necessary to retrieve that portion of the file from the secondary storage medium, and write it into the physical memory. The newly retrieved file typically replaces other information in the physical memory. The replaced information can be written back to the secondary storage.

In virtual memory, a portion of the operating system, which is referred to herein as the virtual memory subsystem, automatically keeps active parts of a program in memory and inactive parts in the secondary storage. When an inactive part is required, the virtual memory subsystem retrieves it from the secondary storage and writes it into the physical memory, replacing an unneeded part if necessary. To facilitate this task, the memory is divided into individual units called pages, and the swapping of data between the secondary storage and the physical memory is done on a page-by-page basis.

Since the management of the memory takes place outside of the application program when virtual memory technology is employed, the application program itself can behave as if the physical memory were much larger than it actually is. As a result, programmers are able to write programs that can run on many differently configured systems. Similarly, a system can be reconfigured without the need for modifying any of the application programs.

In the past, the virtual memory subsystem was entirely responsible for the exchange of information between the computer's physical memory and the secondary storage medium, also known as the backing store. To accomplish this task, close working ties were required between the virtual memory subsystem and the file system. As the different types of backing store, and the hardware in which they are implemented, becomes more varied, the complexity of the virtual memory subsystem, and hence the operating system of which it forms a part, must increase to accommodate these variations.

It is desirable to provide a virtual memory management system which is modular in structure, to enable the operating system, and more particularly the virtual memory subsystem, to maintain its basic functionality without requiring it to become more complex as new types of backing stores are added to a computer. To this end, it is also desirable to improve the performance of virtual memory by giving the file system more control over the management of the memory. To accomplish these goals, however, it is necessary to break the currently existing ties between the virtual memory subsystem and the file system in an efficient manner that does not adversely affect the functionality of the operating system.

BRIEF SUMMARY OF THE INVENTION

In accordance with the present invention, the foregoing objectives, as well as others, are achieved through decentralization of the backing store management, so that it takes place outside of the operating system. The entity responsible for a backing store management communicates with the virtual memory subsystem through a message-based relationship. With this approach, the backing store can be managed without requiring close ties between the virtual memory subsystem and the file system.

The basic unit of a decentralized backing store management system is a backing object. Backing objects are abstract representations of the data in the backing store. They are supplied by backing store management entities, which are hereinafter referred to as backing object providers. For example, a file system can serve as a backing object provider, and can provide backing objects related to the files that it controls. The operating system can also provide backing objects which relate to it, such as cross-address space mappings. The information represented by a given backing object is determined by its provider.

The primary role of a backing object provider is to manage the relationship between the object's backing store data and the physical memory. For example, providers handle operations such as reading data from a backing store into physical memory, writing the data, and maintaining a backing store cache. Providers do not perform other operations carried out by the operating system, for example address based operations such as associating logical addresses with the backing store or manipulation of the memory hardware.

Requests for backing store data are conveyed from the virtual memory subsystem to providers by messages addressed to the providers. These messages relate, for example, to address space changes, and to basic functions such as reading and writing. Providers can implement additional messages for use by both the operating system and application software.

In the preferred implementation of the invention, a backing store provider employs a cache to streamline access to the backing store data. More particularly, a separate cache is established for each backing store provider. The decentralization of the backing store in this manner, and more particularly the decentralization of the backing store cache control, provides several benefits. Backing store management policies can be tailored to the nature of the backing store and the hardware on which it is located. Thus, for example, more intelligent network operations and portable paging can be provided.

The foregoing features and advantages of the invention are explained in greater detail hereinafter with reference to specific embodiments illustrated in the accompanying drawings.

DETAILED DESCRIPTION

Figure 1:
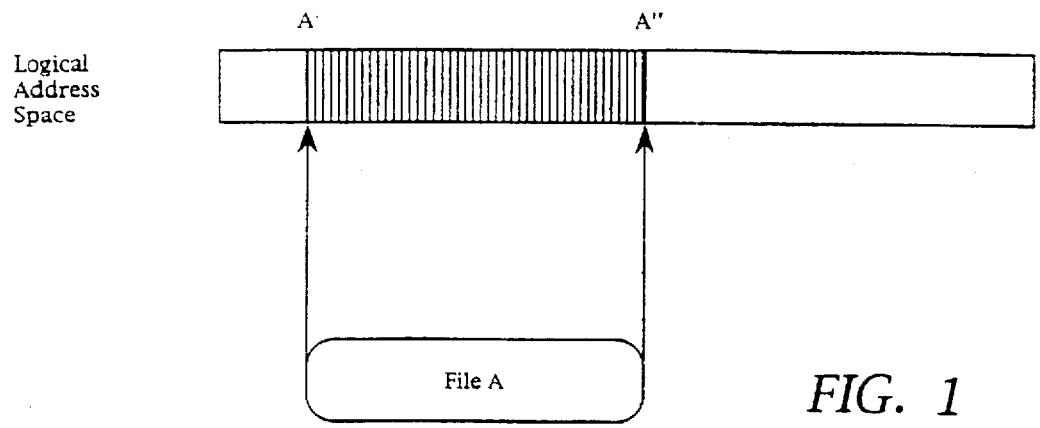
FIG. 1 is a diagram showing the location of a file in a logical address space in accordance with the prior art.
Figure 2:
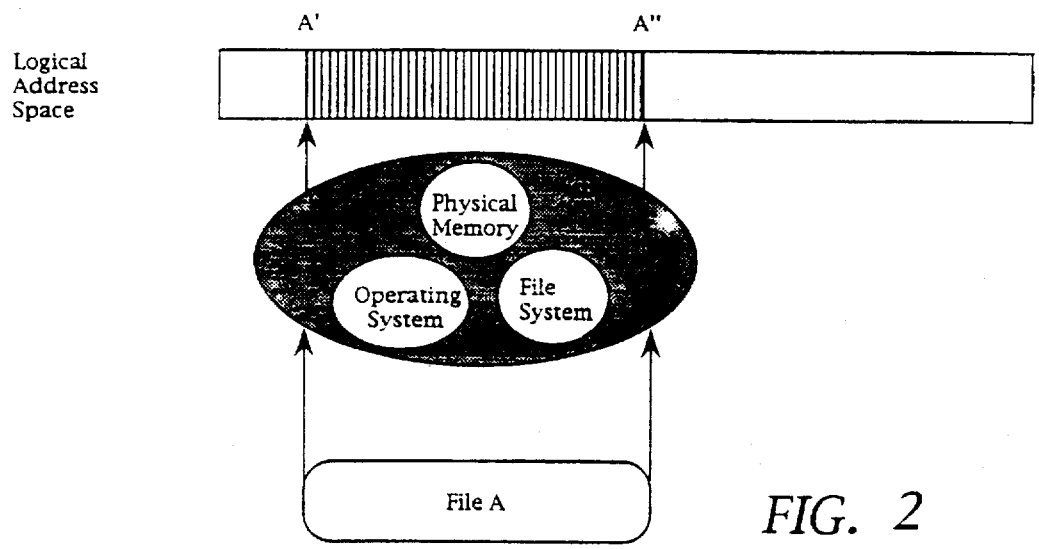
FIG. 2 is a diagram showing the relationship of the operating system, file system and physical memory to the file and the logical address space in accordance with the prior art.
Figure 3:
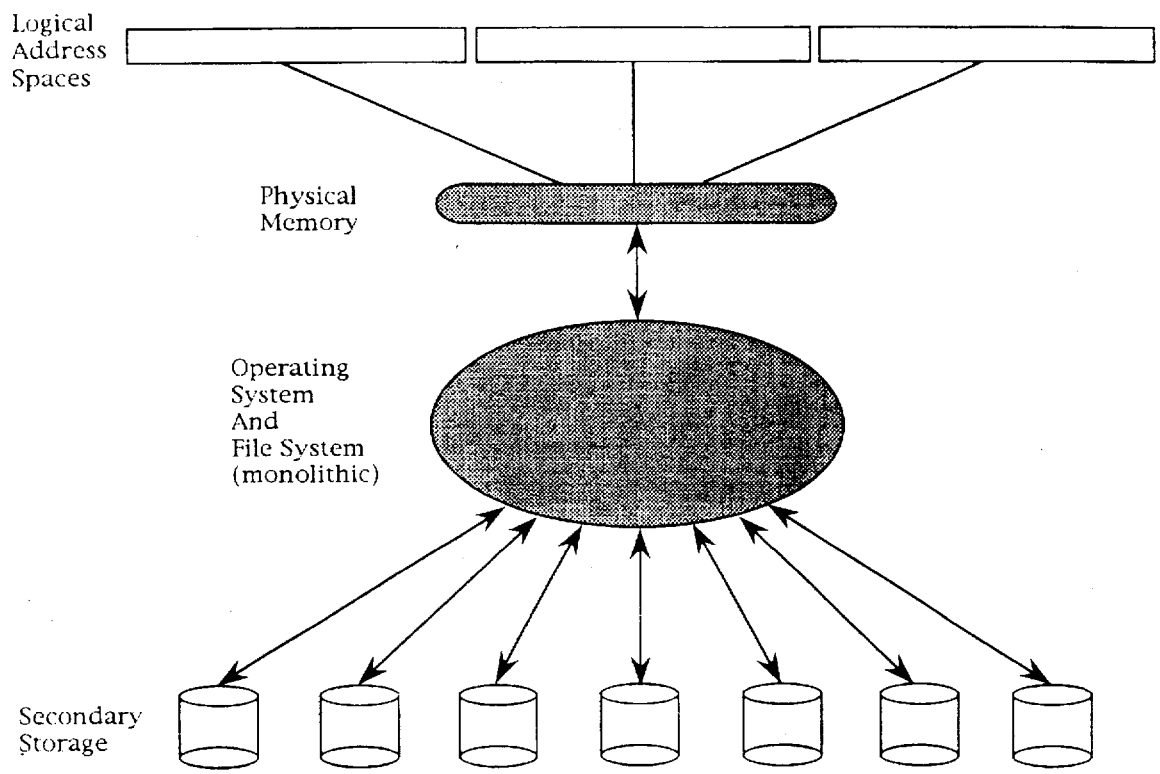
FIG. 3 is a diagram of a centralized virtual memory management system.

To facilitate an understanding of the invention and its applications, a brief overview of computer memory management is first provided with reference to FIGS. 1–3. Generally speaking, information that is accessed by the computer's instruction processor (CPU) is specified by a location, hereinafter referred to as a logical address. A program is assigned a domain of logical addresses, hereinafter referred to as a logical address space, as part of being prepared to run. In a virtual memory computer, logical addresses are an abstraction of the true location of the information. A portion of the computer's hardware is responsible for converting given abstract logical addresses into concrete physical addresses. This conversion process is referred to as mapping. The primary purpose of using this abstraction is to achieve the virtual memory effect that logical addressing is independent of the physical memory addressing.

Virtual memory provides a further abstraction, wherein a range of logical addresses corresponds to secondary storage such that secondary storage data is available to the instruction processor (CPU) by ordinary load and store operations in the logical address space. This abstraction is referred to as file mapping. Referring to FIG. 1, an application program may need to access the contents of a file A. This file is accessible via ordinary data loads and stores against logical addresses in the range A' to A". In other words, the file A is mapped into that logical address space. Referring to FIG. 2, it can be seen that file mapping is achieved through a cooperation between the operating system and the file system to present the file data in the computer's physical memory and then in the logical address space.

In the operation of a computer having virtual memory, during any given interval an application program uses only a relatively small amount of the physical memory. The portion of the memory that the program uses during an interval is referred to as its working set. The virtual memory subsystem loads the program's working set, which consists of a number of pages, into the physical memory. The remainder of the program is retained in secondary storage, such as a magnetic or optical disk. In this case, the data cannot be directly accessed by the computer's processor. At some point during its operation, the application program will request data from a logical address that does not correspond to the physical memory. When this occurs, a page fault exception is generated. In response to the exception, the operating system suspends the operation of the application program, and the virtual memory subsystem cooperates with the file system to read the required page of data into physical memory. When the page has been stored in the physical memory and mapped, the operating system returns control to the program, and processing continues.

In the past, a centralized design, of the type shown in FIG. 3, was used for management of a virtual memory system. In a centralized approach of this type, the virtual memory subsystem and the file system are directly responsible for all aspects of the transfer of data between the secondary storage and the physical memory. As a result, they are required to be able to handle all of the types of media and data organizations that might be encountered within the computer's configuration. As the types of secondary storage media and data organization become more varied, the virtual memory subsystem and the file system must become more complex.

Figure 4:
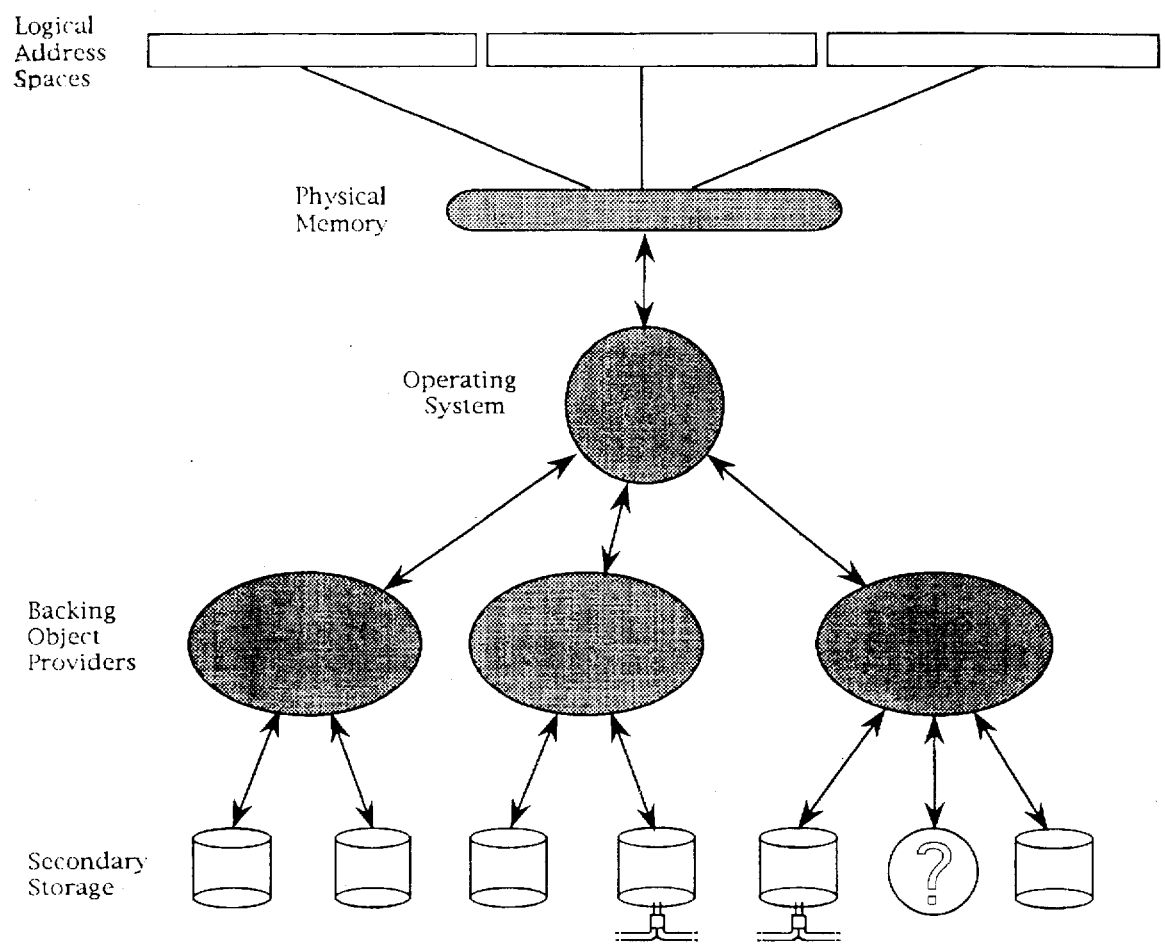
FIG. 4 is a diagram of a decentralized virtual memory management system in accordance with the present invention.

In accordance with the present invention, the simplicity of the operating system can be preserved by decentralizing the management of the virtual memory. Referring to FIG. 4, information stored in the secondary storage, e.g. a file, is identified as a backing object. In the decentralized approach of the present invention, the handling of backing objects is implemented by software entities which are external to the operating system, and which are referred to herein as backing object providers. The responsibility for various tasks associated with the management of memory, particularly virtual memory, is divided between the operating system and the backing object providers. As described in greater detail hereinafter, the operating system retains responsibility for all services and operations that pertain to the overall management of the memory, such as creating and removing logical address spaces, programming the computer's memory management unit (MMU) to map logical addresses to physical addresses, copying data across address spaces, and the like. The backing object providers are responsible for those services that are specific to a particular backing store and the backing objects associated with it.

Backing object providers can be designed for the various types of storage media that are encountered, and more particularly to the organization of the data on the media. For example, one backing object provider can be employed for magnetic disk storage, both internal and removable, another backing object provider can be employed for secondary storage that is available over a network, and another backing object provider can be utilized for other types of memory, such as flash or bubble memory. Alternatively, two or more backing object providers can be associated with a single magnetic disk, if the data is organized on different parts of the disk in different formats. Generally speaking, each backing object provider manages the secondary storage with which it is associated, thereby allowing the operating system to remain relatively small and simple even when disparate media and data organizations are present within the computer system. The backing object providers interact with the operating system through a messaging protocol that enables the virtual memory system to operate in a modular fashion.

When an application program is opened, or calls for a file, the operating system implements services to associate the appropriate stored information, i.e. a backing object, with logical address ranges. In the implementation of these services, the operating system first sends a message to a backing object provider to prepare a specified file as a backing object. In reply to this message, the backing object provider returns an identification for the specified backing object. Subsequently, the operating system is requested to associate the backing object with a range of logical addresses in a given logical address space. Such a request might be generated by the file system, for example. In response to this request, the operating system informs the backing object provider that the backing object is being used, and to make any necessary further preparations. Conversely, when a file is unmapped, the operating system sends a message to the provider that the backing object is being disassociated from the logical address space, and to perform any necessary finalization.

Figure 5A:
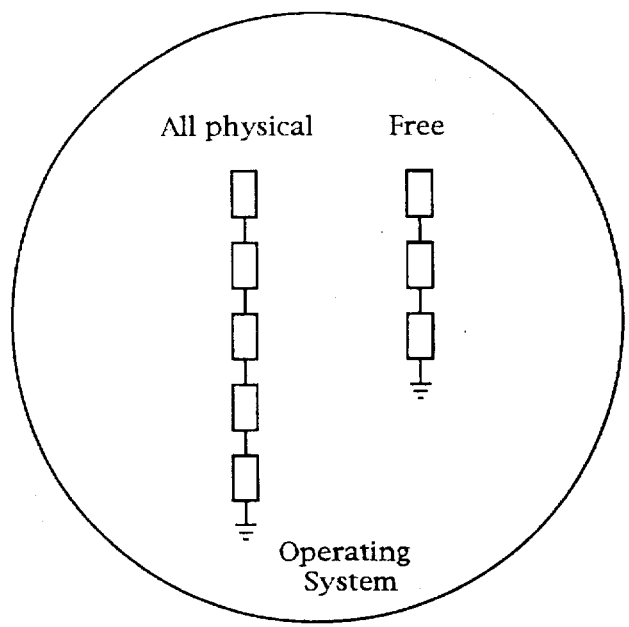
FIGS. 5A and 5B illustrate the respective page tracking responsibilities of the operating system and the backing object provider.
Figure 5B:
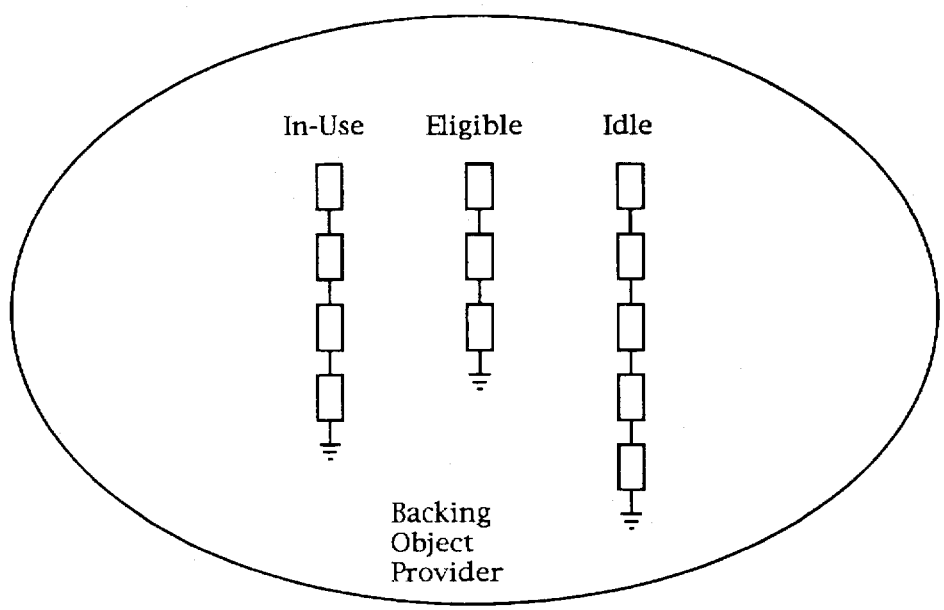

As described previously, in a virtual memory system, the available memory is divided into a number of individual units called pages. Each page of the memory can reside in one of several different states, depending upon the status of the data stored in that page. In prior centralized virtual memory systems, the operating system was responsible for keeping track of all of the status information regarding the pages of memory. In the decentralized approach of the present invention, the tasks pertaining to the tracking of pages are divided between the operating system and the backing object provider. FIGS. 5A and 5B illustrate the overall organizational structure of the page tracking function. FIG. 5A represents the pages tracked by the operating system. Specifically, the operating system keeps track of the most recent use of each of the physical pages of memory (to assist in aging), as well as where each is mapped and its associated backing object provider. The operating system is also responsible for maintaining a list of those physical pages that are not allocated to any backing object provider, i.e. pages that are in a "free" state.

Referring to FIG. 5B, each backing object provider keeps track of the physical pages of memory which contain data from the backing store(s) that it manages. These physical pages of memory that are maintained by the provider form a backing store cache. The pages in a backing store cache can be in one of three states. In-use pages are those that are mapped into address spaces. Idle pages are those that have been loaded with data by the backing object provider but are not currently mapped into address spaces. Eligible pages are in-use pages that have been identified as candidates for page replacement. The classification of each page into one of these three states is determined, for the most part, by the course of events which occur in the operation of the computer. The classification of a page as eligible for replacement is made by the backing object provider, however, based upon any suitable criterion such as page aging.

Figure 6:
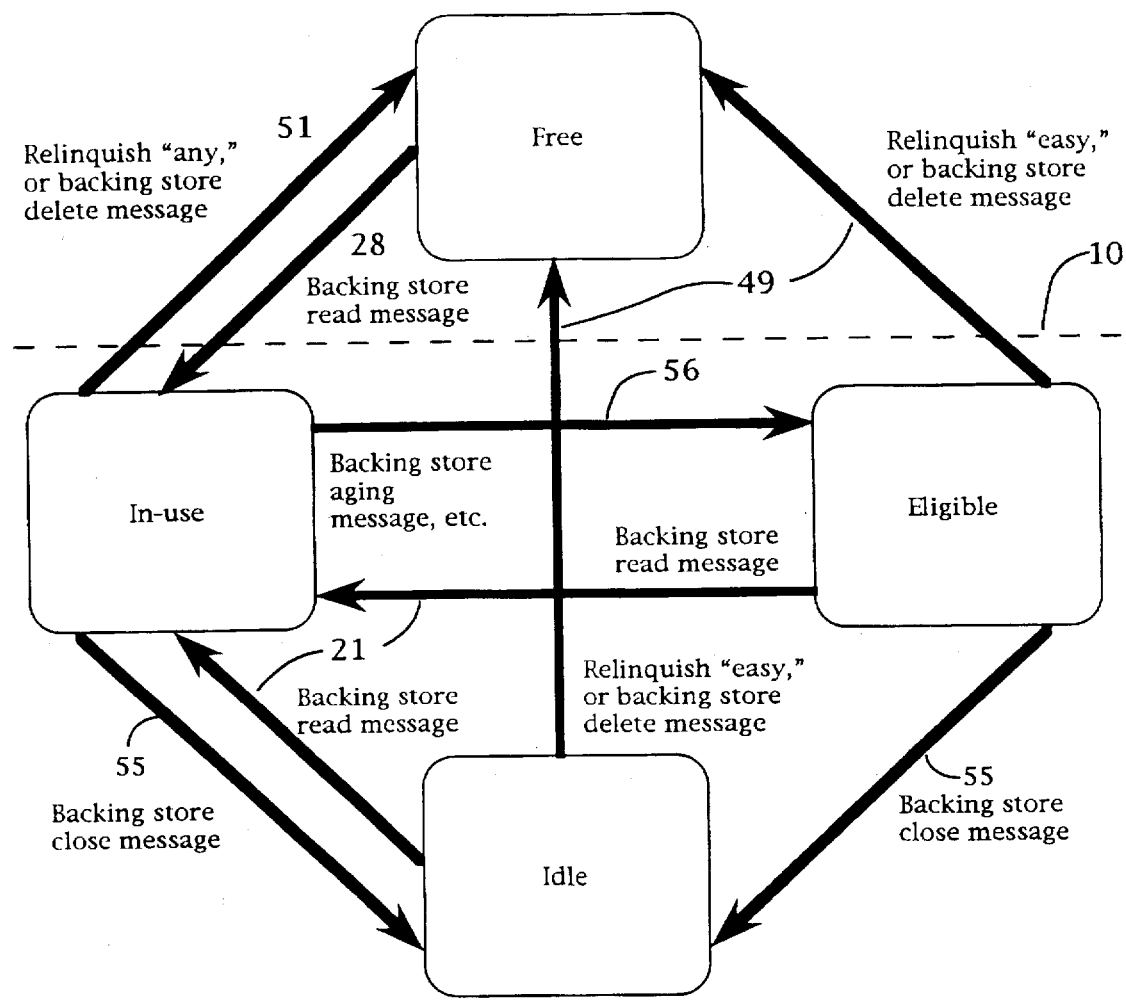
FIG. 6 is a state diagram illustrating the four possible states that can be occupied by a page of memory.

FIG. 6 is a diagram illustrating the possible state changes for the physical pages of memory. The free state is located above a dashed line 10, to represent that it is tracked by the virtual memory portion of the operating system. The other states below the dashed line are tracked by the backing object provider. In operation, a change in state occurs as a direct result of messages processed by the provider. These messages are indicated by the arrows between the various states. These messages are explained hereinafter with reference to the flow charts of FIGS. 7 and 8, which depict the operation of a decentralized virtual memory system in accordance with the present invention.

Figure 7:
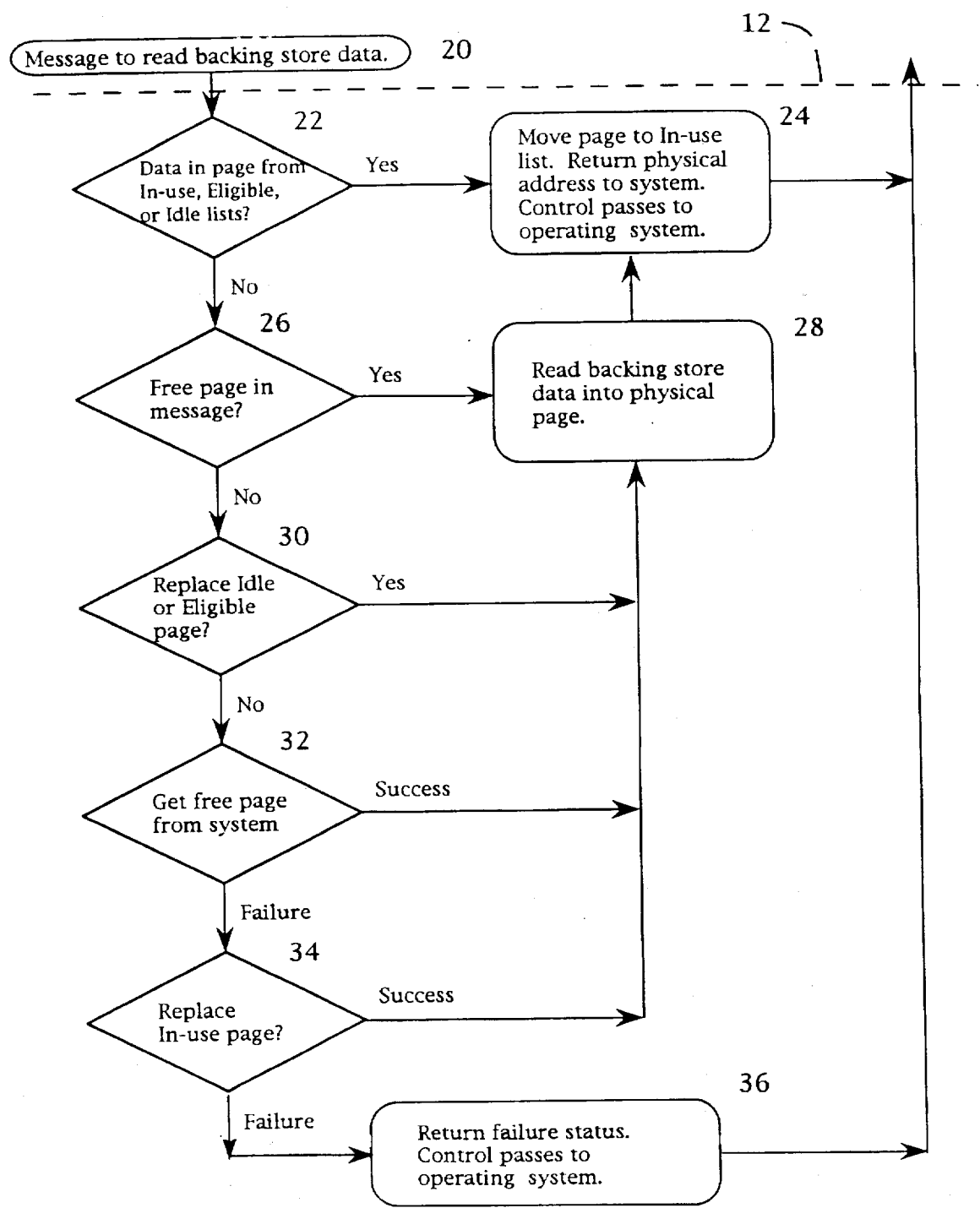
FIG. 7 is a flow chart illustrating the operation of reading backing store data into physical memory.

As noted previously, the operating system is responsible for the overall management of the memory. One of these responsibilities includes the general handling of a page fault exception when one is generated in response to a request for information by an application program. FIG. 7 is a flowchart that shows how data is acquired from the secondary storage in accordance with the present invention when a page fault exception is generated. Logic which appears below the dashed line 12 takes place in the backing object provider, and logic above the line is implemented in the operating system.

In response to a page fault exception, the operating system determines which backing object provider is responsible for the data that has been requested by the application program, i.e. which backing object or which backing object provider is associated with the logical address that generated the exception. Upon making such a determination, the operating system generates a message to read backing store data (Step 20). At the time that the operating system generates the message to read backing store data, it also determines whether there are any free pages in physical memory. If so, an identification of a free page is included in the message. In response to the request to read backing store data, the backing object provider determines whether the requested data is present in its associated cache (Step 22). If the data is present in its cache, the provider moves the page of data to the in-use list, if it was not already there (arrows 21 in FIG. 6), and returns the physical address of that page to the operating system. At the same time control also passes to the operating system (Step 24). In response thereto, the operating system maps the logical address to the physical address provided by the backing object provider, and resumes execution of the program that incurred the page fault.

If the backing object provider is unable to locate the requested data in its cache at Step 22, it checks the message to determine whether a free page is available (Step 26). If so, the data is read from the backing store into the free page in the physical memory (Step 28). That page is also placed in the provider's in-use list, and the physical address is returned to the operating system (Step 24).

If a free page is not identified in the message from the operating system, the provider determines if a page can be easily obtained from its own cache, by checking for a page on its idle or eligible list (Step 30). If such page is available, the data is read from the backing store into that page of physical memory (Step 28). If the backing store provider does not have any readily available pages in its cache, i.e. its eligible and idle lists are empty, the provider requests the operating system to provide a free page (Step 32). In response thereto, the operating system supplies a page, if any, from a list of free physical pages. Otherwise, as explained in greater detail hereinafter with reference to FIG. 8, the operating system requests the other backing object providers to relinquish physical pages from their caches. If any such page is available, the data is read from the backing store into that page (Step 28), and control returned to the operating system (Step 24).

Finally, if the request for physical memory from the operating system fails, the provider must determine if any page from its own cache, i.e. a page from its in-use list, can be made available (Step 34). If so, the backing store data is read into that page (Step 28), and control returned to the operating system (Step 24). If no in-use page is available for the requested data, the provider returns a failure status to the operating system, and control passes back to the operating system (Step 36).

Figure 8:
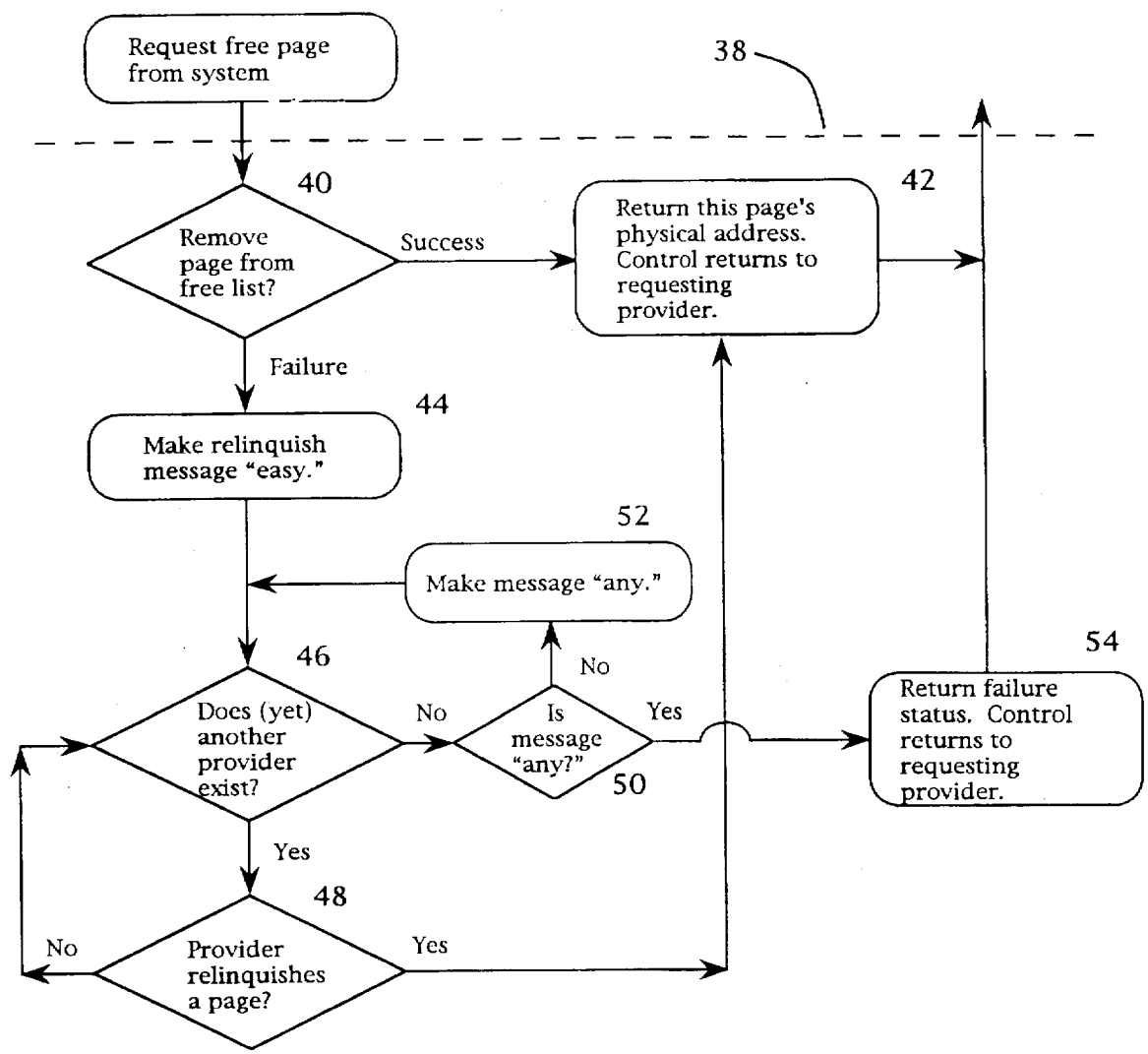
FIG. 8 is a flow chart illustrating the operation of obtaining a page memory for use by a backing store provider.

The procedure that is carried out when the backing object provider makes a call to the operating system to request a free page is illustrated in greater detail in FIG. 8. Referring thereto, logic occurring below the dashed line 38 takes place within the operating system, and logic above the line pertains to the backing object provider. In response to a request for free page by the backing object provider (generated at Step 32 of FIG. 7), the operating system determines whether there are any pages on its free list (Step 40). If so, the page is removed from the free list, and its physical address is given to the backing object provider. At this point, control of the operation also returns to the backing object provider (Step 42).

In the event that a page is not available from the free list, the operating system first asks the providers, one at a time, to relinquish an easily available page, i.e. an idle or eligible page (Steps 44–48). If a page is available from one of the other providers, it is removed from that provider's eligible or idle list, and its physical address is returned to the requesting provider, along with control of the process (Step 42). If no providers are able to relinquish a page in response to this request, the operating system repeats the request. The repeated request is labeled as an urgent one, in which the operating system asks for any possible page (Steps 50–52). In response to the urgent request, each backing object provider determines if one of the pages from its in-use list is no longer required, and can be replaced with data from the requesting backing object provider. If a page is available, it is moved from the provider's in-use list to the operating system's free list, as indicated by arrow 51 in FIG. 6. Its physical address is then returned to the requesting backing object provider, along with processing control (Step 42). In essence, therefore, the page of memory is moved from the cache of the relinquishing provider to the cache of the requesting provider. In the event that no page is available from the other providers, a failure status is returned to the requesting provider (Step 54), and operations proceed to Step 34 in FIG. 7.

When a backing object no longer needs to be mapped, e.g. a file has been closed, the operating system sends a message to the backing object provider to close the backing object. In response thereto, the provider moves the page(s) containing the backing object from its in-use or eligible list to the idle state (arrows 55 in FIG. 6). If a file is removed from the backing store, the operating system instructs the backing object provider to delete the backing object. In response to this message, the backing object provider removes the associated page(s) of memory from its cache and returns them to the operating system's free list (arrows 49 and 51 in FIG. 6).

Each backing object provider can also implement conventional cache optimization techniques to load data into its cache and write modified physical memory pages to the backing store. For example, a locality of reference approach can be employed to load adjacent backing store data into physical memory pages in the idle state when a message to read data is received. Each provider can be tailored to the organization of data on the backing stores that it controls to achieve the most suitable form of cache optimization.

To efficiently manage page replacement and relinquishing, each backing object provider determines, on an ongoing basis, which physical pages in its cache currently appear to be less needed than others. These pages are placed in the eligible list for the cache. The determination that a page is eligible is based on criteria designed into the backing object provider. For example, in a sequentially accessed backing store, the provider could make a physical page eligible when the current position in the backing store moves beyond the range mapped to that physical page.

The operating system also supplies page aging information to the providers for their optional use. This information is notification that a particular physical page has remained unreferenced by the application program long enough that it appears unlikely to be used in the near future. In response to this information, the provider can move the page from its in-use list to its eligible list, as shown by arrow 56 in FIG. 6, or it can ignore this information and re-assign page status based on other criteria.

Preferably, in its ongoing process of determining page states, a backing object provider identifies a set of pages, any of which are eligible for replacement, rather than a single best physical page. Thus, the providers are only required to determine states of relative disuse of pages, rather than carrying out the more specific, and time consuming, determination as to the single best physical page for replacement. As a result, providers are well suited to handle backing store requests. Because eligible physical pages remain in the cache, they can be efficiently located in a cache look-up for the corresponding backing store data. At the same time, page replacement is simplified because eligible physical pages have already been identified as part of the ongoing process.

From the foregoing, it can be appreciated that the present invention provides a decentralized approach to the management of backing stores in a virtual memory system. In particular, by decentralizing the virtual memory cache, and establishing a separate backing store cache for each provider, the virtual memory system has a modular structure that enables it to readily accommodate changes in secondary storage and data organization formats without affecting the basic operating system.

It will be appreciated that the present invention is not limited to the specific embodiments which have been described herein to facilitate an understanding of its underlying principles. The scope of the invention is defined by the claims which are appended hereto, rather the foregoing description, and all equivalents which are consistent with the meaning of the claims are intended to be embraced therein.

What is claimed is:

1. A virtual memory management system for a computer having a physical memory and a backing store, where said physical memory and said backing store together function as a virtual memory, comprising:

an operating system for allocating space in said physical memory for the storage of data, for receiving requests for data stored in said physical memory, and for generating requests for data to be stored in said physical memory when said received requests specify data which is not stored in said physical memory; and a backing store provider for external to said operating system and associated with said backing store, for receiving said requests for data generated by sid operating system and determining the location of the requested data in the backing store, and for retrieving the requested data and causing it to be stored in the physical memory, said backing store provider having an associated memory cache in which data from the backing store can be stored, said backing store provider being responsive to a request for data from said operating system to check the contents of its associated cache and, if the requested data is stored therein, to advise the operating system of the address of the requested data in the cache.

2. The virtual memory system of claim 1 wherein said backing store provider determines portions of its associated memory cache which are eligible to have the contents of their data replaced and provides an indication of such portions to said operating system.

3. The virtual memory management system of claim 1, wherein said backing store provider comprises a software entity associated with said computer, but external to said operating system.

4. The virtual memory system of claim 1, wherein said cache comprises a portion of said computers's physical memoruy.

5. In a computer having a physical memory, one or more backing stores in which information is stored and an operating system for allocating space in said physical memory for the storage of information, a method for managing the physical memory and backing store to implement a virtual memory system, comprising the steps of:

provustring at least one backing object provider which is external to the operating system for presenting information from a backing store to the physical memory;

establishing a cache which comprises a portion of said physical memory into which said backing object provider can store information that is read from an associated backing store;

generating an exception when the computer requests access to information that is not mapped into a logical address space of the physical memory;

transmitting a message from the operating system to the backing object provider in response to the generation of the exception, said message instructing the backing object provider to provide the requested information;

loading the requested information into said cache by means of said backing object provider; and transmitting a message from the backing object provider to the operating system which identifies the location in the cache of the requested information.

6. The method of claim 5 wherein said backing object provider responds to a message from the operating system to provide requested information by the steps of:

checking the contents of the cache to determine whether the requested information is already stored in the cache;

reading the requested information from a backing store and loading it into the cache if it is not already stored therein; and transmitting said message which identifies the location of the requested information.

7. The method of claim 5 wherein said backing object provider monitors the information stored in its cache and identifies portions of the information which are eligible to be replaced by other information.

8. The method of claim 7 wherein the operating system maintains a list of free portions of memory that are not associated with a cache, and said message instructing the backing object provider to provide requested information includes an identification of a free portion of memory when one is available.

9. The method of claim 8 wherein the step of loading requested information includes the steps of determining whether the message from the operating system includes an identification of a free portion of memory, loading the requested information into a free portion of memory that has been identified, and transferring the loaded portion of memory to said cache.

10. The method of claim 9 wherein, if a free portion of memory is not identified in the message from the operating system, the backing object provider performs the steps of:

determining whether any portions of the cache have been identified as eligible for replacement;

loading the requested information into any portion of the cache which has been identified as eligible for replacement; and requesting a portion of memory from the operating system if no portion of the cache has been identified as eligible for replacement.

11. In a computer having a physical memory, one or more backing stores in which information is stored and an operating system for allocating space in said physical memory for the storage of information, a method for managing the physical memory and backing store to implement a virtual memory system, comprising the steps of:

providing a plurality of backing object providers which are external to the operating system for presenting information from a backing store to the physical memory;

establishing a plurality of caches respectively associated with said backing object providers, each of said caches comprising a portion of said physical memory into which its associated backing object provider can store information that is read from a backing store;

generating an exception when the computer requests access to information that is not mapped into a logical address space of the physical memory;

transmitting a message from the operating system to one of the backing object providers in response to the generation of the exception, said message instructing the backing object provider to provide the requested information;

loading the requested information into the cache associated with said one backing object provider; and transmitting a message from said one backing object provider to the operating system which identifies the location in its associated cache of the requested information.

12. The method of claim 11 wherein each backing object provider monitors the information stored in its cache and identifies portions of the information which are eligible to be replaced by other information.

13. The method of claim 12 wherein the operating system maintains a list of free portions of memory that are not associated with a cache, and said message instructing a backing object provider to provide requested information includes an identification of a free portion of memory when one is available.

14. The method of claim 13 wherein the step of loading requested information includes the steps of determining whether the message from the operating system includes an identification of a free portion of memory, loading the requested information into a free portion of memory that has been identified, and transferring the loaded portion of memory to the cache associated with the backing object provider that loaded the requested information.

15. The method of claim 14 wherein, if a free portion of memory is not identified in the message from the operating system, said one backing object provider performs the steps of:

determining whether any portions of its associated cache have been identified as eligible for replacement;

loading the requested information into any portion of its cache which has been identified as eligible for replacement; and requesting a portion of memory from the operating system if no portion of its cache has been identified as eligible for replacement.

16. The method of claim 15 wherein said operating system responds to a request from a backing object provider for a portion of memory by the steps of:

determining whether any portions of the memory have been identified as free, and providing an available free portion to said one backing object for transfer to its cache;

if no portion of memory is available, requesting the other backing object providers to relinquish a portion of a cache which has been identified as eligible for replacement;

if no other backing object provider has identified a portion of its cache as eligible for replacement, requesting the other backing object providers to relinquish any portion of an associated cache; and transferring a portion of a cache which has been relinquished by an other backing object provider to the cache associated with said one backing object provider.

17. A virtual memory management system for a computer having a physical memory and a plurality of backing stores, comprising:

an operating system for allocating space in said physical memory for the storage of data, for receiving requests for data stored in said physical memory, and for generating requests for data to be stored in said physical memory; and a plurality of backing store providers which are respectively associated with different ones of said backing stores, for receiving said requested data in an associated said operating system and determining the location of the request data in an associated backing store, and for retrieving the requested data and causing it to be stored in the physical memory, each of said backing store providers having a separate cache memory associated therewith in which data read from its associated backing store by that provider can be stored.

18. The virtual memory management system of claim 17 wherein each backing store provider responds to a request for a data from said operating system by checking the contents of its associated memory cache and, if the requested data is stored therein, advising the operating system of the address of the requested data in its cache.

19. The virtual memory system of claim 18 wherein each of said backing store provider determines portions of its associated memory cache which are eligible to have the contents of their data replaced and provides an indication of such portions to said operating system.

20. The virtual memory management system of claim 17, wherein said backing store providers comprise software entities with said computer, but external to said operating system.

21. A virtual memory management system for a computer having a physical memory and a plurality of backing stores, comprising:

an operating system for allocating space in said physical memory for the storage of data, for receiving requests for data stored in said physical memory, and for generating requests for data to be stored in said physical memory; and a plurality of backing store providers which are respectively associated with different ones of said backing stores, for receiving said requests for data generated by said operating system and determining the location of the requested data in an associated backing store, and for retrieving the requested data and causing it to be stored in the physical memory;

wherein each backing store provider has associated therewith a portion of said physical memory which forms a cache in which data read from a backing store by that provider can be stored;

wherein each backing store provider responds to a request for data from said operating system by checking the contents of its associated memory cache and, if the requested data is stored therein, advising the operating system of the address of the requested data in its cache;

wherein each of said backing store providers determines portions of its associated memory cache which are eligible to have the contents of their data replaced and provides an indication of such portions to said operating system; and further wherein a backing object provider can request a portion of said physical memory from said operating system and, in response thereto, said operating system transfers a portion of memory assigned to the cache of another one of said providers to the cache associated with the requesting provider.

* * * * *